(12) United States Patent
Chen et al.

(10) Patent No.: US 11,323,906 B2
(45) Date of Patent: May 3, 2022

(54) METHOD FOR TERMINAL MEASUREMENT AND CONFIGURATION, TERMINAL AND BASE STATION

(71) Applicant: VIVO MOBILE COMMUNICATION CO., LTD., Guangdong (CN)

(72) Inventors: Li Chen, Guangdong (CN); Fei Qin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 106 days.

(21) Appl. No.: 16/622,257

(22) PCT Filed: Jun. 11, 2018

(86) PCT No.: PCT/CN2018/090603
§ 371 (c)(1),
(2) Date: Dec. 12, 2019

(87) PCT Pub. No.: WO2018/228317
PCT Pub. Date: Dec. 20, 2018

(65) Prior Publication Data
US 2020/0137604 A1 Apr. 30, 2020

(30) Foreign Application Priority Data
Jun. 12, 2017 (CN) .......................... 201710440257.2

(51) Int. Cl.
*H04W 24/10* (2009.01)
*H04W 76/27* (2018.01)
(Continued)

(52) U.S. Cl.
CPC .......... *H04W 24/10* (2013.01); *H04W 36/08* (2013.01); *H04W 48/20* (2013.01); *H04W 52/0251* (2013.01); *H04W 76/27* (2018.02)

(58) Field of Classification Search
CPC ..... H04W 24/02; H04W 24/08; H04W 24/10; H04W 52/02; H04W 52/0216;
(Continued)

(56) References Cited

U.S. PATENT DOCUMENTS 9,363,693 B2 * 6/2016 Fukuta .................. H04W 24/08
9,402,197 B2 * 7/2016 Fujishiro ............... H04W 24/08
(Continued)

FOREIGN PATENT DOCUMENTS

CN          101299860 A         11/2008
CN          102595522 A          7/2012
(Continued)

OTHER PUBLICATIONS

"LRFP: An RF Coverage Reporting Protocol for LTE Systems". Asad A. Khan,, et al, IEEE Wireless Communications • Dec. 2011 (Year: 2011).*

(Continued)

*Primary Examiner* — William D Cumming
(74) *Attorney, Agent, or Firm* — Gearhart Law LLC; David Postolski, Esq.

(57) ABSTRACT

A method for terminal measurement and configuration, a terminal and a base station are provided. The method for terminal measurement and configuration applied to the terminal includes: detecting a state parameter of the terminal; and obtaining measurement configuration information configured based on the state parameter. The method for terminal measurement and configuration applied to the base station includes: obtaining a state parameter of a terminal; and feeding back measurement configuration information to the terminal based on the state parameter. Therefore, the measurement configuration information configured based on the state parameter of the terminal is obtained, and more control optimization on the behavior of the terminal can be (Continued)

performed according to the measurement configuration information. Thus, power consumption of the terminal is saved in a communication system.

15 Claims, 5 Drawing Sheets

(51) Int. Cl.
*H04W 36/08* (2009.01)
*H04W 48/20* (2009.01)
*H04W 52/02* (2009.01)

(58) Field of Classification Search
CPC ............... H04W 72/042; H04W 26/24; H04W 52/0251; H04W 52/219; H04W 52/146; H04W 28/06
USPC .................................. 455/436; 376/311, 252
See application file for complete search history.

(56) References Cited

U.S. PATENT DOCUMENTS

| | | | |
|---|---|---|---|
| 9,408,151 B2* | 8/2016 | Uemura | H04W 52/0251 |
| 10,142,949 B2* | 11/2018 | Imamura | H04W 52/146 |
| 10,172,125 B2* | 1/2019 | Kusashima | H04L 5/0051 |
| 10,298,306 B2* | 5/2019 | Shimezawa | H04L 69/22 |
| 10,389,422 B2* | 8/2019 | Muruganathan | H04B 7/0619 |
| 10,524,142 B2* | 12/2019 | Kusashima | H04W 72/085 |
| 10,763,936 B2* | 9/2020 | Shimezawa | H04L 69/22 |
| 2010/0041412 A1 | 2/2010 | Yu | |
| 2011/0136489 A1* | 6/2011 | Funnell | H04W 36/24 455/436 |
| 2012/0003979 A1* | 1/2012 | Sugahara | H04W 24/10 455/436 |
| 2013/0208617 A1* | 8/2013 | Fukuta | H04W 24/08 370/252 |
| 2014/0044002 A1* | 2/2014 | Fujishiro | H04W 24/08 370/252 |
| 2014/0220974 A1 | 8/2014 | Hsu | |
| 2014/0295770 A1 | 10/2014 | Song et al. | |
| 2015/0036574 A1* | 2/2015 | Uemura | H04W 72/042 370/311 |
| 2015/0072705 A1 | 3/2015 | Zhang | |
| 2015/0072706 A1 | 3/2015 | Michaelsen et al. | |
| 2017/0048734 A1* | 2/2017 | Kusashima | H04W 72/042 |
| 2017/0055242 A1* | 2/2017 | Kusashima | H04W 72/042 |
| 2017/0195028 A1* | 7/2017 | Shimezawa | H04W 28/06 |
| 2017/0201306 A1* | 7/2017 | Shimezawa | H04W 52/0219 |
| 2018/0343045 A1* | 11/2018 | Muruganathan | H04B 7/0619 |
| 2018/0352495 A1 | 12/2018 | Yanagisako | |
| 2019/0124631 A1* | 4/2019 | Ren | H04L 5/0048 |
| 2019/0207663 A1* | 7/2019 | Shimezawa | H04L 69/22 |
| 2020/0120521 A1* | 4/2020 | da Silva | H04W 48/16 |
| 2020/0137604 A1* | 4/2020 | Chen | H04W 36/08 |
| 2020/0178133 A1* | 6/2020 | Chen | H04L 5/00 |
| 2020/0350969 A1* | 11/2020 | Shimezawa | H04B 7/0626 |

FOREIGN PATENT DOCUMENTS

| | | |
|---|---|---|
| CN | 103167551 A | 6/2013 |
| CN | 103781090 A | 5/2014 |
| CN | 105592496 A | 5/2016 |
| CN | 107995647 A | 5/2018 |
| EP | 2395785 A1 | 12/2011 |
| EP | 2533562 A1 | 12/2012 |
| EP | 2747474 A1 | 6/2014 |
| EP | 3136782 B1 * | 3/2020 ............ H04W 36/08 |
| EP | 3 641 384 A1 * | 4/2020 |
| WO | 2017056425 A1 | 4/2017 |
| WO | 2017095467 A | 6/2017 |
| WO | WO-2018077014 A1 * | 5/2018 ............ H04W 24/00 |

OTHER PUBLICATIONS

D. Jacq, P. Chatonnay, C. Bloch, P. Canalda and F. Spies, "Towards zero-configuration for Wi-Fi indoor positioning system," 2017 International Conference on Indoor Positioning and Indoor Navigation (IPIN), Nov. 2017, pp. 1-8, doi: 10.1109/IPIN.2017.8115951. (Year: 2017).*
Xingbing Cao and Lili Liu, "Research of the RRC layer IDLE State in TD-LTE," 2010 International Conference on Educational and Information Technology, Sep. 2010, pp. V3-349-V3-352, doi: 10.1109/ICEIT.2010.5608354. (Year: 2010).*
Translation of International Preliminary Report on Patentability and Written Opinion, dated Dec. 17, 2019, for corresponding PCT Application No. PCT/CN2018/090603, International Filing Date Jun. 11, 2018, consisting of 6 pages.
International Preliminary Report on Patentability and Written Opinion, dated Dec. 17, 2019, for corresponding PCT Application No. PCT/CN2018/090603, International Filing Date Jun. 11, 2018, consisting of 9 pages.
Partial Supplementary European Search Report, dated May 6, 2020, for corresponding PCT Application No. PCT/CN2018/090603, International Filing Date Jun. 11, 2018, consisting of 15 pages.
First Office Action from the State Intellectual Property Office of People's Republic of China, dated Nov. 20, 2019, for corresponding Chinese Application No. 201710440257.2, Priority date of Jun. 12, 2017, consisting of 11 Pages.
Translation of First Office Action from the State Intellectual Property Office of People's Republic of China, dated Nov. 20, 2019, for corresponding Chinese Application No. 201710440257.2, Priority date of Jun. 12, 2017, consisting of 14 Pages.
Second Office Action from the State Intellectual Property Office of People's Republic of China, dated Mar. 13, 2020, for corresponding Chinese Application No. 201710440257.2, Priority date of Jun. 12, 2017, consisting of 10 Pages.
Translation of Second Office Action from the State Intellectual Property Office of People's Republic of China, dated Mar. 13, 2020, for corresponding Chinese Application No. 201710440257.2, Priority date of Jun. 12, 2017, consisting of 12 Pages.
Third Office Action dated Jun. 8, 2020 issued in Chinese Application No. 201710440257.2.
Extended European Search Report dated Sep. 1, 2020 issued in PCT/CN2018/090603.
International Search Report dated Jul. 27, 2018, corresponding to International Application No. PCT/CN2018/090603, International Filing Date Jun. 11, 2018, consisting of 4-pages.

* cited by examiner

METHOD FOR TERMINAL MEASUREMENT AND CONFIGURATION, TERMINAL AND BASE STATION

CROSS REFERENCE OF RELATED APPLICATION

This application is the U.S. national phase of PCT Application No. PCT/CN2018/090603 filed on Jun. 11, 2018, which claims a priority to Chinese patent application No. 201710440257.2 filed on Jun. 12, 2017, the disclosures of which are incorporated herein by reference in their entireties.

TECHNICAL FIELD

The present disclosure relates to the field of communication technologies, and in particular to a method for terminal measurement and configuration, a terminal, and a base station.

BACKGROUND

In a Long Term Evolution (LTE) system, configurations related to measurements and events of measurement reports are defined in the Radio Resource Control (RRC) protocol specification. A User Equipment (UE, also referred to as a terminal) performs a measurement on all cells in a list of serving cells and storage cells according to measurement configuration, and reports a measurement result. The measurement report may be periodic reporting or event triggered, and the related definition is defined in the technical specification (TS) 36.331.

The measurement-related requirements are defined in the TS 36.133 as follows. For a serving cell, in a case that connected-mode Discontinuous Reception (DRX) is not configured, a measurement sample (Sample) is needed within a certain measurement duration (such as 200 ms), if a measurement report is configured; measurement needs to be performed for downlink synchronization, if no measurement report is configured. In a case that the connected-mode DRX is configured for a serving cell, the measurement requirements are set according to a DRX pattern, for example, at least one measurement sample is needed within a certain measurement duration (N DRX cycles). For neighbor cells, it is required to measure up to 8 strongest cells. Specifically, when a measurement is performed to obtain a measurement sample may depend on the implementation of the UE.

For an idle mode measurement, a trigger condition for when the measurement is performed on neighbor cells is defined in the TS 36.304. The measurement-related requirements are also defined in the TS 36.133.

With the development of intelligent terminals, sensors on intelligent terminals are increasing and are becoming more and more intelligent. In many situations and scenarios, a terminal can accurately know whether it is in a mobile state, as well as a moving speed and related mobile information. In addition, the intelligent terminal carrying more sensors (Sensors) may acquire a state, or environment information or coverage information of the UE, and may perform more control optimization on the behavior of the terminal according to the acquired information, such as performing optimization on Radio Resource Management (RRM) measurement and on idle mode measurements for the UE, thereby achieving the objective of saving power.

However, there is no scheme for performing measurement and configuration for a terminal state in a communication system (for example, LTE or 5G) in the related art, which is disadvantageous for the UE to save power consumption.

SUMMARY

In a first aspect, the present disclosure provides a method for terminal measurement and configuration, which is applied to a terminal. The method includes: detecting a state parameter of the terminal; and obtaining measurement configuration information configured based on the state parameter.

In a second aspect, the present disclosure further provides a method for terminal measurement and configuration, which is applied to a base station. The method includes: obtaining a state parameter of a terminal; and feeding back measurement configuration information to the terminal based on the state parameter.

In a third aspect, the present disclosure further provides a terminal, which includes: a detection module, configured to detect a state parameter of the terminal; and a first obtaining module, configured to obtain measurement configuration information configured based on the state parameter.

In a fourth aspect, the present disclosure further provides a terminal, including: a memory, a processor, and a computer program that is stored on the memory and executable on the processor. The computer program is executed by the processor to implement steps of the method for terminal measurement and configuration in the first aspect.

In a fifth aspect, the present disclosure further provides a computer readable storage medium, where the computer readable storage medium stores a computer program, and the computer program is executed by a processor to implement steps of the method for terminal measurement and configuration in the first aspect.

In a sixth aspect, the present disclosure further provides a base station, which includes: a fourth obtaining module, configured to obtain a state parameter of a terminal; and a feedback module, configured to feed back measurement configuration information to the terminal based on the state parameter.

In a seventh aspect, the present disclosure further provides a base station, which includes: a memory, a processor, and a computer program that is stored on the memory and executable on the processor, where the computer program is executed by the processor to implement steps of the method for terminal measurement and configuration in the second aspect.

In an eighth aspect, the present disclosure further provides a computer readable storage medium. The computer readable storage medium stores a computer program, and the computer program is executed by a processor to implement steps of the method for terminal measurement and configuration in the second aspect.

BRIEF DESCRIPTION OF THE DRAWINGS

In order to more clearly illustrate technical solutions of embodiments of the present disclosure, the drawings used in the description of the embodiments of the present disclosure will be briefly described. It is obvious that the drawings in the following description are only some embodiments of the present disclosure. Other drawings may also be obtained by those of ordinary skill in the art in view of the drawings without creative effort.

DETAILED DESCRIPTION

Technical solutions in embodiments of the present disclosure are clearly and completely described below with reference to accompanying drawings in the embodiments of the present disclosure. It is obvious that the described embodiments are only a part of the embodiments of the present disclosure, and not all of the embodiments of the present disclosure. All other embodiments obtained by a person of ordinary skill in the art without creative effort based on the embodiments of the present disclosure shall fall within the protection scope of the present disclosure.

Figure 1:
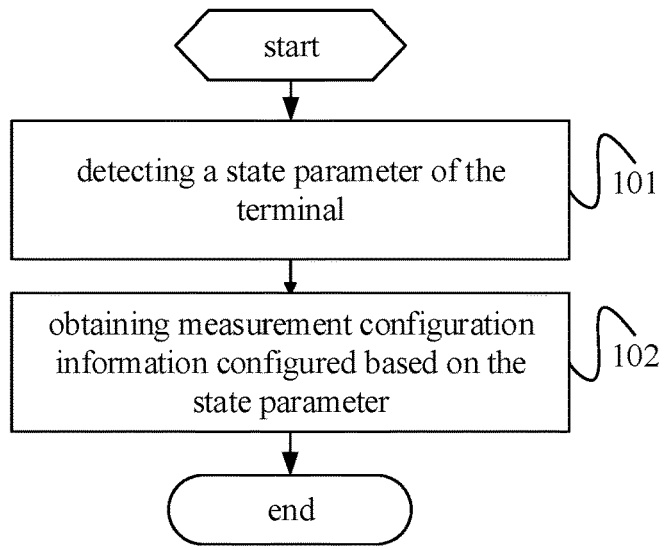
FIG. 1 is a flow chart of a method for terminal measurement and configuration according to some embodiments of the present disclosure.

As shown in FIG. 1, some embodiments of the present disclosure provide a method for terminal measurement and configuration, which is applied to a terminal and includes steps 101 and 102.

Step 101 includes: detecting a state parameter of the terminal.

It should be noted that the state parameter includes at least one of: a type of the terminal (for example, a high-performance or a high-level terminal, or a low-performance or low-level terminal), an environment where the terminal is located (for example, a relatively static channel condition, a slowly-changing channel condition, or a fast-changing channel condition), mobile state information of the terminal (for example, a high-speed mobile state, and a low-speed mobile state), service state information of the terminal (for example, services with different requirements on delays, services with different requirements on interruption probabilities), information about a signal coverage at a location where the terminal is located (for example, at a cell center or a cell edge), or mode information of the terminal.

The mode information includes a measurement mode (a low requirement measurement mode, LM mode) or a power saving mode (PS mode) of the terminal.

It should be noted that the state parameter may be detected by a sensor on the terminal.

Step 102 includes: obtaining measurement configuration information configured based on the state parameter.

It should be noted that after obtaining the measurement configuration information, the terminal needs to perform a cell or beam measurement according to the measurement configuration information, and needs to report a measurement result in a specific case, thereby achieving communication integrity, and saving power consumption of a UE in a communication system.

It should be noted that the measurement configuration information may be obtained by the terminal in combination with related information from the base station side, or may be directly transmitted by the base station to the terminal.

According to an embodiment of the present disclosure, when the measurement configuration information is obtained by the terminal in combination with the related information from the base station side, the method for terminal measurement and configuration further includes: obtaining a measurement configuration parameter.

The measurement configuration parameter includes at least one of: measurement requirement information, periodicity information of a measurement, event configuration information of the measurement, or mode information of the terminal.

The measurement requirement information and the event configuration information of the measurement are determined in accordance with a predetermined rule (for example, measurement requirement information and the event configuration information of the measurement being predefined in the standard), or are configured by a base station and transmitted to the terminal.

Specifically, an implementation process of step 102 includes obtaining the measurement configuration information based on the measurement configuration parameter and the state parameter.

It should be noted that, in this implementation manner, the terminal needs to obtain the measurement configuration parameter, and obtain the measurement configuration information by combining the measurement configuration parameter with the state parameter of the terminal. It should be noted that the measurement requirement information in the measurement configuration parameter may be predefined in the standard and directly known by a terminal side; or it may be determined by a base station side and transmitted to the terminal. The periodicity information and the event configuration information of the measurement in the measurement configuration parameter are determined by the base station side and transmitted to the terminal. It should also be noted that the measurement configuration parameter may only contain the mode information of the terminal. In a case that the measurement configuration parameter only contains the mode information of the terminal, the method for terminal measurement and configuration further includes: obtaining a correspondence between the mode information and at least one of the measurement configuration information, the measurement requirement information, the periodicity information of the measurement, and the event configuration information of the measurement.

The correspondence is determined in accordance with a preset rule (for example, predefined in the standard). Alternatively, the correspondence is configured by the base station for the terminal and transmitted to the terminal through one of: a dedicated radio resource control (RRC) message, an RRC configuration message, an RRC reconfiguration message, a system broadcast message, or a system message.

It should be noted that when the measurement configuration parameter includes the mode information of the terminal, a manner of obtaining the mode information includes: obtaining the mode information configured by the base station; or determining the mode information of the terminal according to a mode switching command transmitted by the base station; or determining the mode information of the terminal based on the state parameter.

Optionally, the method for terminal measurement and configuration further includes: performing a measurement on a target parameter based on the measurement configuration information.

The target parameter includes a cell or a beam, and the corresponding measurement includes at least one of: a Radio Resource Management (RRM) measurement, a Radio Link Monitoring (RLM) measurement, or an idle mode measurement.

The above RRM measurement, RLM measurement and idle mode measurement in a system before 5G system includes cell measurement based on a reference signal, and the reference signal includes a cell reference signal (CRS) or a channel state information reference signal (CSI-RS). These reference signals are configured based on a cell.

In the 5G system or the subsequent evolved system, the measurement is based on a reference signal for a cell or a beam (Beam), and the reference signal includes a channel state information reference signal (CSI-RS), a demodulation reference signal (DMRS), a sounding reference signal (SRS) or a synchronization reference signal (SS block). These reference signals may be configured based on a cell or a beam.

It should be noted that when the measurement configuration parameter includes periodicity information of the measurement, an implementation manner of performing the measurement on the target parameter includes: performing a periodic measurement according to the periodicity information. A period of the periodic measurement is determined by at least one manner of:

determining the period by a base station based on the state parameter of the terminal, and configuring the period for the terminal by the base station; or determining the period by the terminal based on the state parameter of the terminal; or determining the period in accordance with a predetermined rule.

The period herein may correspond to a measurement sampling interval in the LTE system, or a newly defined measurement period.

It should be noted that this implementation manner is a periodic trigger. The base station configures a long measurement period, or periodic measurement and reporting for the terminal. It should be noted that the period may not be the same as a Discontinuous Reception (DRX) period. A length of the period is configured based on the state parameter of the terminal.

Optionally, when the measurement configuration parameter includes event configuration information of the measurement, an implementation manner of performing the measurement on the target parameter includes: performing an event trigger measurement on the target parameter based on the event configuration information.

Event information in the event configuration information includes at least one of: an access event of the terminal (that is, starting measurement before an access is enabled), a state parameter change event of the terminal, or an event triggered by the terminal based on a state parameter change. The event information is configured by the base station and transmitted to the terminal, or is determined by the terminal based on the state parameter.

It should be noted that this implementation manner is an event trigger. The terminal determines whether to perform connected mode measurement (radio resource management (RRM) measurement) and/or perform idle mode measurement (such as measurement during camping) according to its own state parameter, or perform measurement before the terminal accesses.

It should also be noted that the terminal may directly perform measurement based on the state parameter of the terminal, and a specific implementation manner includes: determining, based on the state parameter of the terminal, whether to perform a measurement based on the measurement configuration information; and performing a measurement on a cell or a beam when it is determined that it is required to perform a measurement based on the measurement configuration information.

After the measurement for the terminal is completed, the terminal reports a measurement result obtained by the performed measurement to the base station, when the measurement result needs to be transmitted to the base station. The measurement result may be data obtained from the measurement, or may be data obtained after performing a corresponding processing on the data obtained from the measurement (for example, calculating an average value based on the data obtained from the measurement, or calculating an average value of the data within a preset window length, or performing L1 filtering or L2 filtering, or L3 filtering on the measurement results).

When the measurement configuration information is directly transmitted by the base station to the terminal, an implementation manner of the above step 102 includes:

transmitting the state parameter to a base station; and
receiving the measurement configuration information fed back by the base station based on the state parameter.

It should be noted that the terminal usually transmits the state parameter to the base station in the predetermined message. Specifically, the predetermined message may be an RRC message or a newly added user assistance message. Upon receipt of the state parameter, the base station side obtains the mode information of the terminal based on the state parameter, and then obtains the measurement configuration information corresponding to the mode information. It should be noted that the base station may directly receive the state parameter transmitted by the terminal, or may also obtain the state parameter of the terminal based on the predetermined information. The predetermined information includes information related to the determination of the state parameter, that is, the predetermined information is assistance information pre-stored by the base station, from which the state parameter may be learned. The predetermined information may include timing advance (TA) information, positioning (AoA) information, context information of the terminal, service information of the terminal, information reported by the terminal when a capability is reported, or the like.

It should also be noted that the network side may configure whether to transmit the state parameter. A specific implementation manner includes: the base station transmitting parameter reporting configuration information to the terminal; and the terminal receiving the parameter reporting configuration information transmitted by the base station, and transmitting the state parameter of the terminal to the base station in a case that the parameter reporting configuration information indicates that the state parameter is allowed to being reported.

The parameter reporting configuration information is used to indicate whether the state parameter is allowed to being reported.

Optionally, a timer may also be introduced. The method includes: starting a state parameter reporting timer when the terminal reports the state parameter; and stopping transmitting the state parameter to the base station within a timing time of the state parameter reporting timer.

According to an embodiment of the present disclosure, the method further includes: transmitting configuration assistance information to the base station, where the configuration assistance information includes at least one of: a measurement period expected by the terminal, identification information of the measurement configuration information corresponding to the state parameter, or mode information of the terminal.

The terminal may determine the measurement configuration information according to the assistance information.

Figure 7:
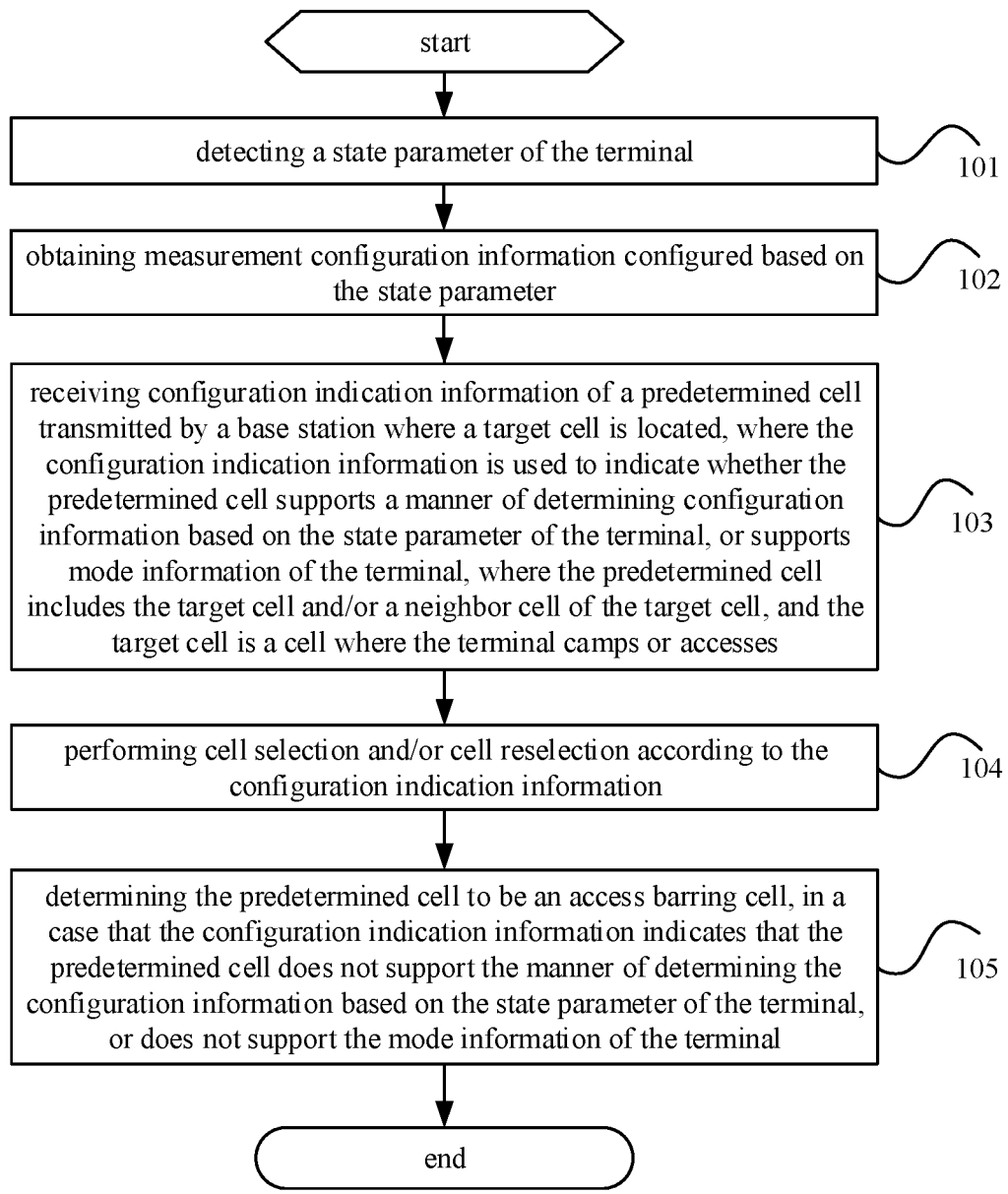
FIG. 7 is a flow chart of a method for terminal measurement and configuration to some other embodiments of the present disclosure.

Optionally, as shown in FIG. 7, the method for terminal measurement and configuration further includes:

step 103, receiving configuration indication information of a predetermined cell transmitted by a base station where a target cell is located, where the configuration indication information is used to indicate whether the predetermined cell supports a manner of determining configuration information based on the state parameter of the terminal, or supports mode information of the terminal; and step 104, performing cell selection and/or cell reselection according to the configuration indication information, where the predetermined cell includes the target cell and/or a neighbor cell of the target cell, and the target cell is a cell where the terminal camps or accesses.

Figure 8:
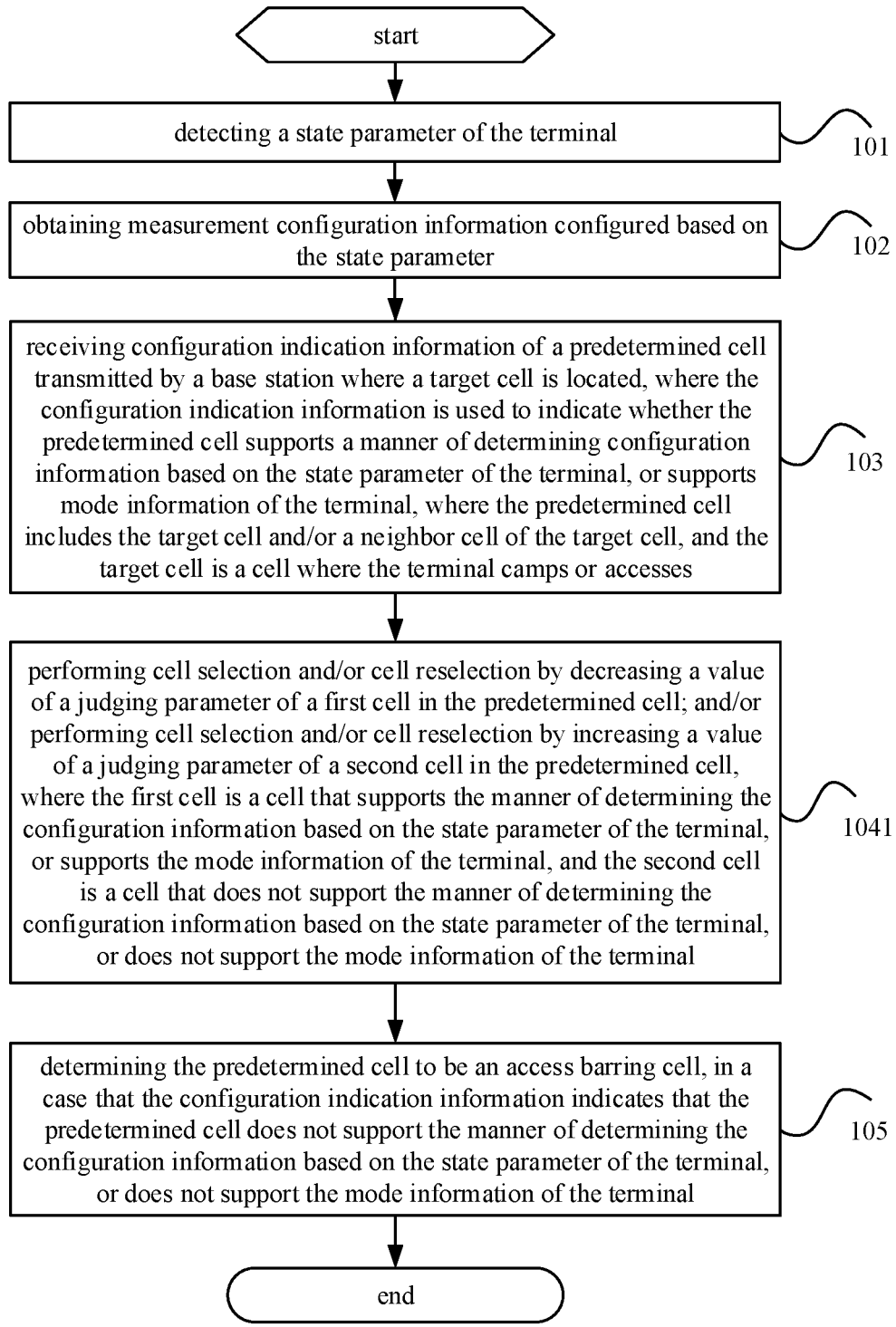
FIG. 8 is a flow chart of a method for terminal measurement and configuration to some other embodiments of the present disclosure.

It should be noted that, as shown in FIG. 7, the method for terminal measurement and configuration further includes: step 105, determining the predetermined cell to be an access barring cell, in a case that the configuration indication information indicates that the predetermined cell does not support the manner of determining the configuration information based on the state parameter of the terminal, or does not support the mode information of the terminal. Specifically, as shown in FIG. 8, a first implementation manner of performing cell selection and/or cell reselection (step 104) includes following step 1041:

performing cell selection and/or cell reselection by decreasing a value of a judging parameter of a first cell in the predetermined cell; and/or performing cell selection and/or cell reselection by increasing a value of a judging parameter of a second cell in the predetermined cell, where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

Figure 9:
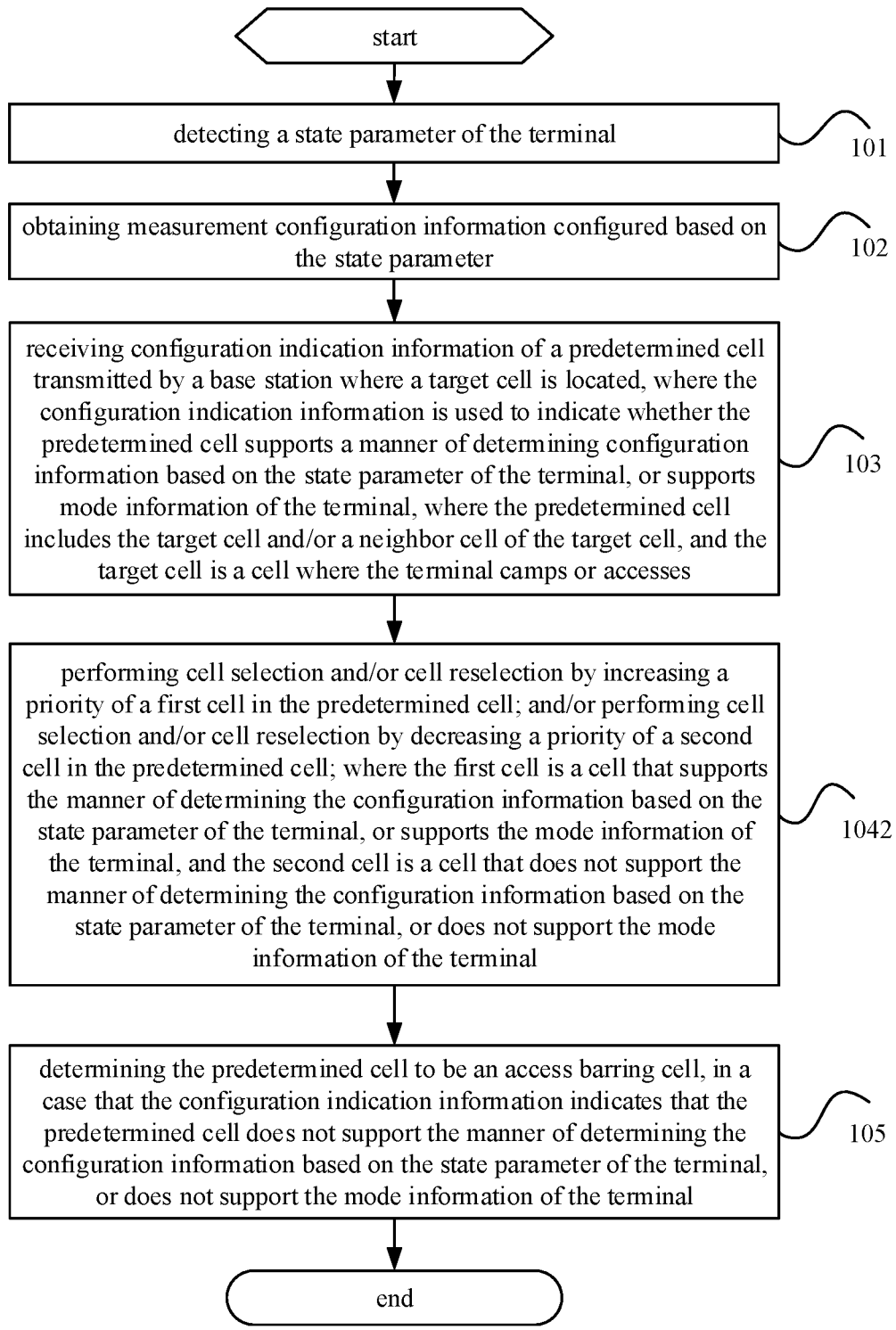
FIG. 9 is a flow chart of a method for terminal measurement and configuration to some other embodiments of the present disclosure.

Specifically, as shown in FIG. 9, a second implementation manner of performing cell selection and/or cell reselection (step 104) includes following step 1042:

performing cell selection and/or cell reselection by increasing a priority of a first cell in the predetermined cell; and/or performing cell selection and/or cell reselection by decreasing a priority of a second cell in the predetermined cell;

where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

A specific implementation manner of performing cell selection and/or cell reselection includes that a cell where the terminal has camped or accessed may notify the terminal whether the cell supports a manner of determining measurement configuration information based on the state parameter of the terminal, or supports the mode information of the terminal which includes an LM mode or a PS mode, in a broadcast mode and in a unicast mode (where the notification in the broadcast mode includes notifying in a reference signal, or in a physical broadcast channel (PBCH), or in a system information block (SIB); and the notification in the unicast mode includes notifying in an RRC dedicated signal, or in a newly designed signal), and may further include notifying whether a neighbor cell supports the manner of performing measurement and configuration based on a mobile state, or supports the LM mode or the PS mode.

In a first manner, in a case that it is determined that a certain cell does not support the manner of determining the configuration information based on the state parameter of the terminal, or does not support the mode information of the terminal, upon receipt of the information, a UE may consider that the cell bars an access of the UE (access barring), and may not camp in the cell; while the cell is a cell where the UE has camped or accessed, the UE may perform cell reselection.

In a second manner, it is considered that a negative offset is added to a cell that does not support the manner of determining the configuration information based on the state parameter of the terminal, or does not support the mode information of the terminal, that is, adding this offset to the existing S criterion or R criterion during cell selection and/or cell reselection, so that the UE can select or reselect the cell with a relatively low probability. Alternatively, a positive offset is added to a cell that supports the manner of determining the configuration information based on the state parameter of the terminal, or supports the mode information of the terminal, so that the UE can select or reselect the cell with a relatively high probability.

In a third manner, when performing cell reselection, a high priority may be set for a cell or a frequency that supports the manner of determining the configuration information based on the state parameter of the terminal or supports the mode information of the terminal, or a low priority may be set for a cell or a frequency that does not support the manner of determining the configuration information based on the state parameter of the terminal or does not support the mode information of the terminal.

It should be noted that, an existing system does not have a scheme of performing measurement and configuration for a terminal state, while in the method for terminal measurement and configuration according to the embodiments of the present disclosure, the measurement configuration information configured based on the state parameter of the terminal is obtained. In such a manner, power consumption of a terminal is saved in a communication system.

Figure 2:
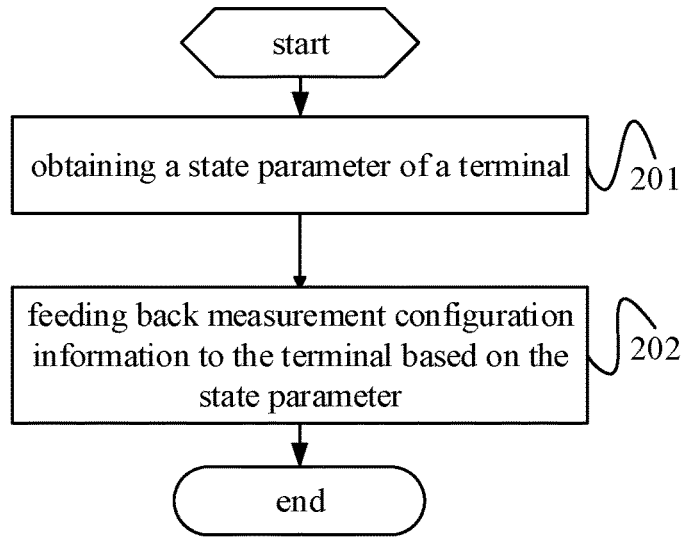
FIG. 2 is a flow chart of a method for terminal measurement and configuration according to other embodiments of the present disclosure.

As shown in FIG. 2, other embodiments of the present disclosure provide a method for terminal measurement and configuration, which is applied to a base station and includes:

step 201: obtaining a state parameter of a terminal; and
step 202: feeding back measurement configuration information to the terminal based on the state parameter.

Specifically, the state parameter includes at least one of a type of the terminal, an environment where the terminal is located, mobile state information of the terminal, service state information of the terminal, information about a signal coverage at a location where the terminal is located, or mode information of the terminal, where the mode information includes a measurement event mode of the terminal or a power saving mode of the terminal.

Optionally, an implementation manner of step 201 includes:

receiving a predetermined message transmitted by the terminal; and obtaining the state parameter of the terminal from the predetermined message, where the predetermined message is a radio resource control RRC message or a user assistance message.

Optionally, before receiving the state parameter of the terminal from the predetermined message transmitted by the terminal, the method further includes: transmitting parameter reporting configuration information to the terminal, where the parameter reporting configuration information is used to indicate whether reporting of the state parameter is allowed.

Optionally, an implementation manner of step 201 includes: obtaining the state parameter of the terminal based on stored predetermined information of the terminal, where the predetermined information includes information related to determining the state parameter.

Specifically, an implementation of step 202 includes:

obtaining mode information of the terminal based on the state parameter;

obtaining the measurement configuration information corresponding to the mode information; and feeding the measurement configuration information back to the terminal.

Optionally, the method for terminal measurement and configuration further includes:

receiving configuration assistance information transmitted by the terminal, where the configuration assistance information includes at least one of: a measurement period expected by the terminal, identification information of the measurement configuration information corresponding to the state parameter, or mode information of the terminal.

Optionally, the method for terminal measurement and configuration further includes: transmitting a measurement configuration parameter to the terminal; where the measurement configuration parameter includes at least one of: measurement requirement information, periodicity information of a measurement, event configuration information of the measurement, or mode information of the terminal.

Optionally, the method for terminal measurement and configuration further includes: transmitting, through a target cell, configuration indication information of a predetermined cell to the terminal, where the configuration indication information is configured for the terminal to perform cell selection and/or cell reselection according to the configuration indication information, where the configuration indication information is used to indicate whether the predetermined cell supports a manner of determining configuration information based on the state parameter of the terminal, or supports mode information of the terminal, the predetermined cell includes the target cell and/or a neighbor cell of the target cell, and the target cell is a cell where the terminal has camped or accessed.

It should be noted that all the descriptions about the base station side in the foregoing embodiments are applicable to the base station to which the method for terminal measurement and configuration is applied, and the same technical effects can be achieved.

Figure 3:
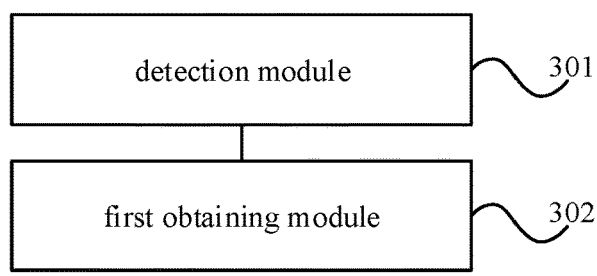
FIG. 3 is a schematic block diagram of a terminal according to some embodiments of the present disclosure.

As shown in FIG. 3, some embodiments of the present disclosure provide a terminal, which includes:

a detection module 301, configured to detect a state parameter of the terminal; and a first obtaining module 302, configured to obtain measurement configuration information configured based on the state parameter.

Specifically, the state parameter includes at least one of a type of the terminal, an environment where the terminal is located, mobile state information of the terminal, service state information of the terminal, information about a signal coverage at a location where the terminal is located, or mode information of the terminal, where the mode information includes a measurement mode of the terminal or a power saving mode of the terminal.

Optionally, the terminal further includes a second obtaining module, configured to obtain a measurement configuration parameter.

Specifically, the first obtaining module 302 is configured to: obtain the measurement configuration information based on the measurement configuration parameter and the state parameter.

The measurement configuration parameter includes at least one of: measurement requirement information, periodicity information of a measurement, event configuration information of the measurement, or mode information of the terminal.

The measurement requirement information and the event configuration information of the measurement are determined in accordance with a predetermined rule, or are configured by a base station and transmitted to the terminal.

Optionally, when the measurement configuration parameter includes the mode information of the terminal, the terminal further includes: a third obtaining module, configured to obtain a correspondence between the mode information and at least one of the measurement configuration information, the measurement requirement information, the periodicity information of the measurement, and the event configuration information of the measurement.

The correspondence is determined in accordance with a preset rule. Alternatively, the correspondence is configured by the base station for the terminal, and is transmitted to the terminal by one of: a dedicated radio resource control RRC message, an RRC configuration message, an RRC reconfiguration message, a system broadcast message, or a system message.

Optionally, when the measurement configuration parameter includes the mode information of the terminal, a manner of obtaining the mode information includes:

obtaining the mode information configured by the base station; or determining the mode information of the terminal according to a mode switching command transmitted by the base station; or determining the mode information of the terminal based on the state parameter.

Optionally, the terminal further includes a measurement module, configured to perform a measurement on a target parameter based on the measurement configuration information.

The measurement includes at least one of: a radio resource management RRM measurement, a radio link monitoring RLM measurement, or an idle mode measurement.

Optionally, when the measurement configuration parameter includes periodicity information of the measurement, the measurement module is configured to perform a periodic measurement according to the periodicity information.

A period of the periodic measurement is determined by at least one manner of:

determining the period by a base station based on the state parameter of the terminal, and configuring the period for the terminal by the base station; or determining the period by the terminal based on the state parameter of the terminal; or determining the period in accordance with a predetermined rule.

Optionally, when the measurement configuration parameter includes event configuration information of the measurement, the measurement module is configured to perform an event trigger measurement on the target parameter based on the event configuration information.

Specifically, event information in the event configuration information includes at least one of: an access event of the terminal, a state parameter change event of the terminal, or an event triggered by the terminal based on a state parameter change.

Specifically, the event information is configured by a base station and transmitted to the terminal, or is determined by the terminal based on the state parameter.

Optionally, the measurement module is configured to determine, based on the state parameter of the terminal, whether the measurement is performed based on the measurement configuration information.

Optionally, the terminal further includes a reporting module, configured to report a measurement result obtained by the performed measurement to a base station.

Specifically, the first obtaining module includes:

a transmission submodule, configured to transmit the state parameter to the base station; and a first receipt submodule, configured to receive the measurement configuration information fed back by the base station based on the state parameter.

Specifically, the transmission submodule is configured to transmit the state parameter to the base station in a predetermined message, where the predetermined message is a radio resource control RRC message or a user assistance message.

Specifically, the transmission submodule includes:

a receipt unit, configured to receive parameter reporting configuration information transmitted by the base station, where the parameter reporting configuration information is used to indicate whether reporting of the state parameter is allowed; and a transmission unit, configured to transmit the state parameter of the terminal to the base station, in a case that the parameter reporting configuration information indicates that the reporting of the state parameter is allowed.

Optionally, the terminal further includes a first execution module, configured to start a state parameter reporting timer; and a second execution module, configured to stop transmitting the state parameter to the base station within a timing time of the state parameter reporting timer.

Optionally, when transmitting the state parameter to the base station, the terminal further includes a first transmission module, configured to transmit configuration assistance information to the base station, where the configuration assistance information includes at least one of: a measurement period expected by the terminal, identification information of the measurement configuration information corresponding to the state parameter, or mode information of the terminal.

Optionally the terminal further includes:

a first receipt module, configured to receive configuration indication information of a predetermined cell transmitted by a base station where a target cell is located, where the configuration indication information is used to indicate whether the predetermined cell supports a manner of determining configuration information based on the state parameter of the terminal, or supports mode information of the terminal; and a processing module, configured to perform cell selection and/or cell reselection according to the configuration indication information, where the predetermined cell includes the target cell and/or a neighbor cell of the target cell, and the target cell is a cell where the terminal has camped or accessed.

Optionally, the terminal further includes:

a determination module, configured to determine the predetermined cell to be an access barring cell, in a case that the configuration indication information indicates that the predetermined cell does not support the manner of determining the configuration information based on the state parameter of the terminal, or does not support the mode information of the terminal.

Optionally, the processing module is configured to:

perform cell selection and/or cell reselection by decreasing a value of a judging parameter of a first cell in the predetermined cell; and/or perform cell selection and/or cell reselection by increasing a value of a judging parameter of a second cell in the predetermined cell, where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

Optionally, the processing module is configured to:

perform cell selection and/or cell reselection by increasing a priority of a first cell in the predetermined cell; and/or perform cell selection and/or cell reselection by decreasing a priority of a second cell in the predetermined cell;

where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

It should be noted that these terminal embodiments involve a terminal corresponding to the method for terminal measurement and configuration applied to the terminal side, all implementation manners of the above embodiments are applicable to these terminal embodiments, and the same technical effects can be achieved.

Some embodiments of the present disclosure further provide a terminal, including: a memory, a processor, and a computer program that is stored on the memory and executable on the processor. When executing the computer program, the processor is configured to perform various processes of the method for terminal measurement and configuration applied to the base station side in the above embodiments, and the same technical effects can be achieved, which are not repeated again to avoid repetition.

Some embodiments of the present disclosure further provide a computer readable storage medium, which stores a computer program. The computer program is executed by a processor to implement various processes of the method for terminal measurement and configuration applied to the terminal side in the above embodiments, and the same technical effects can be achieved, which is not repeated again to avoid repetition. The computer readable storage medium includes, for example, a read-only memory (ROM), a random access memory (RAM), a magnetic disk, or an optical disk.

Figure 4:
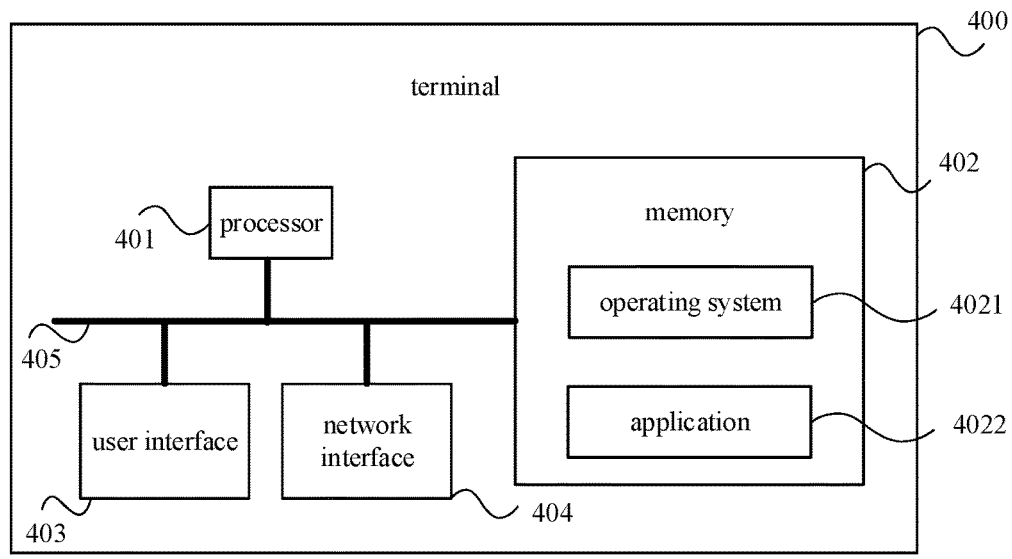
FIG. 4 is a structural block diagram of a terminal according to some embodiments of the present disclosure.

As shown in FIG. 4, FIG. 4 is a structural block diagram of a terminal according to some embodiments of the present disclosure. An application entity of the method for terminal measurement and configuration of the present disclosure will be specifically described below in conjunction with FIG. 4.

As shown in FIG. 4, a terminal 400 includes: at least one processor 401, a memory 402, at least one network interface 404 and a user interface 403. Various components of the terminal 400 are coupled together by a bus system 405. Understandably, the bus system 405 is configured to implement connections and communications among the components. In addition to a data bus, the bus system 405 further includes a power supply bus, a control bus and a state signal bus. However, for clarity of description, the various buses are denoted by the bus system 405 in FIG. 4.

The user interface 403 may include a display, a keyboard, or a click device (e.g., a mouse, a trackball, a touchpad, or a touch screen).

It is understandable that the memory 402 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EPROM), or an electrically erasable programmable read-only memory (EEPROM) or a flash memory. The volatile memory may be a random access memory (RAM) that acts as a high-speed external cache. By way of example and not limitation, many kinds of RAM are viable, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchlink connection dynamic random access memory (SDRAM) and direct memory bus random access memory (DRRAM). The memory 402 of the systems and methods described herein is intended to include, but not limited to, these and any other suitable types of memory.

In some implementations, the memory 402 stores following elements, such as executable modules, data structures, or a subset thereof, or an extended set thereof, which may include an operating system 4021 and an application 4022.

The operating system 4021 includes various system programs, such as a framework layer, a core library layer, a driver layer, and the like, for implementing various basic services and processing hardware-based tasks. The application 4022 includes various applications programs, such as a media player (Media Player), a browser (Browser), and the like, for implementing various application services. A program implementing the method of the embodiments of the present disclosure may be included in the application 4022.

In an embodiment of the present disclosure, the mobile terminal 400 further includes: a computer program stored on the memory 402 and executable on the processor 401. Specifically, the program may be a computer control program in the application 4022. When executing the computer program, the processor 401 is configured to: detect a current state parameter of the terminal; and obtain measurement configuration information configured based on the state parameter.

The state parameter includes at least one of: a type of the terminal, an environment where the terminal is located, mobile state information of the terminal, service state information of the terminal, information about a signal coverage at a location where the terminal is located, or mode information of the terminal, where the mode information includes a measurement mode of the terminal or a power saving mode of the terminal.

All the methods according to the foregoing embodiments of the present disclosure can be applied to the processor 401, or implemented by the processor 401. The processor 401 may be an integrated circuit chip with signal processing capabilities. In implementation, each step of the foregoing methods may be completed by an integrated logic circuit in form of hardware in the processor 401 or instructions in form of software. The above processor 401 may be a general-purpose processor, a digital signal processor (DSP), an application specific integrated circuit (ASIC), a field programmable gate array (FPGA) or any other programmable logic device, discrete gate, transistor logic device or discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module can be located in a conventional storage medium such as a random access memory, a flash memory, a read-only memory, a programmable read-only memory, an electrically erasable programmable memory, a registers, or the like. The computer readable storage medium is located in the memory 402, and the processor 401 reads the information in the memory 402 and completes the steps of the above methods in combination with its hardware. Specifically, the computer readable storage medium stores a computer program, and when the computer program is executed by the processor 401, the following steps are implemented.

It is understandable that the embodiments described herein can be implemented in hardware, software, firmware, middleware, microcode, or a combination thereof. For hardware implementation, the processing unit can be implemented in one or more of an application specific integrated circuit (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic units for performing the functions according to the present disclosure, or a combination of the above.

For software implementation, the technical solutions in the specification may be implemented by modules (e.g., processes, functions, and so on) for performing the functions in the present disclosure. The software code may be stored in the memory and executed by the processor, and the memory may be implemented inside or outside the processor.

Optionally, when executing the computer program, the processor 401 is configured to obtain a measurement configuration parameter.

Optionally, when executing the computer program, the processor 401 is configured to obtain the measurement configuration information based on the measurement configuration parameter and the state parameter.

Specifically, the measurement configuration parameter includes at least one of: measurement requirement information, periodicity information of a measurement, event configuration information of the measurement, or mode information of the terminal. The measurement requirement information and the event configuration information of the measurement are determined in accordance with a predetermined rule, or are configured by a base station and transmitted to the terminal.

Optionally, when executing the computer program, the processor 401 is configured to: when the measurement configuration parameter includes the mode information of the terminal, obtain a correspondence between the mode information and at least one of the measurement configuration information, the measurement requirement information, the periodicity information of the measurement, and the event configuration information of the measurement. The correspondence is determined in accordance with a preset rule; or the correspondence is configured by the base station for the terminal, and is transmitted to the terminal through one of: a dedicated radio resource control RRC message, an RRC configuration message, an RRC reconfiguration message, a system broadcast message, or a system message.

Optionally, when executing the computer program, the processor 401 is configured to: when the measurement configuration parameter includes the mode information of the terminal, obtain the mode information configured by the base station; or determine the mode information of the terminal according to a mode switching command transmitted by the base station; or determine the mode information of the terminal based on the state parameter.

Optionally, when executing the computer program, the processor 401 is configured to perform a measurement on a target parameter based on the measurement configuration information.

The measurement includes at least one of: a radio resource management RRM measurement, a radio link monitoring RLM measurement, or an idle mode measurement.

Optionally, when executing the computer program, the processor 401 is configured to perform a periodic measurement according to the periodicity information, when the measurement configuration parameter includes periodicity information of the measurement.

A period of the periodic measurement is determined by at least one manner of:

determining the period by a base station based on the state parameter of the terminal, and configuring the period for the terminal by the base station; or determining the period by the terminal based on the state parameter of the terminal; or determining the period by the terminal in accordance with a predetermined rule.

Optionally, when executing the computer program, the processor 401 is configured to perform an event trigger measurement on the target parameter based on the event configuration information, when the measurement configuration parameter includes event configuration information of the measurement.

Specifically, event information in the event configuration information includes at least one of: an access event of the terminal, a state parameter change event of the terminal, or an event triggered by the terminal based on a state parameter change.

The event information is configured by a base station and transmitted to the terminal, or is determined by the terminal based on the state parameter.

Optionally, when executing the computer program, the processor 401 is configured to determine, based on the state parameter of the terminal, whether the measurement is performed based on the measurement configuration information.

Optionally, when executing the computer program, the processor 401 is configured to report a measurement result obtained by the performed measurement to a base station.

Optionally, when executing the computer program, the processor 401 is configured to transmit the state parameter to a base station; and receive the measurement configuration information fed back by the base station based on the state parameter.

Optionally, when executing the computer program, the processor 401 is configured to transmit the state parameter to the base station in a predetermined message, where the predetermined message is a radio resource control RRC message or a user assistance message.

Optionally, when executing the computer program, the processor 401 is configured to:

receive parameter reporting configuration information transmitted by the base station, where the parameter reporting configuration information is used to indicate whether reporting of the state parameter is allowed; and transmit the state parameter of the terminal to the base station, in a case that the parameter reporting configuration information indicates that the reporting of the state parameter is allowed.

Optionally, when executing the computer program, the processor 401 is configured to: start a state parameter reporting timer; and stop transmitting the state parameter to the base station within a timing time of the state parameter reporting timer.

Optionally, when executing the computer program, the processor 401 is configured to transmit configuration assistance information to the base station, where the configuration assistance information includes at least one of: a measurement period expected by the terminal, identification information of the measurement configuration information corresponding to the state parameter, or mode information of the terminal.

Optionally, when executing the computer program, the processor 401 is configured to:

receive configuration indication information of a predetermined cell transmitted by a base station where a target cell is located, where the configuration indication information is used to indicate whether the predetermined cell supports a manner of determining configuration information based on the state parameter of the terminal, or supports mode information of the terminal; and perform cell selection and/or cell reselection according to the configuration indication information, where the predetermined cell includes the target cell and/or a neighbor cell of the target cell, and the target cell is a cell where the terminal has camped or accessed.

Optionally, when executing the computer program, the processor 401 is configured to: determine the predetermined cell to be an access barring cell, in a case that the configuration indication information indicates that the predetermined cell does not support the manner of determining the configuration information based on the state parameter of the terminal, or does not support the mode information of the terminal.

Optionally, when executing the computer program, the processor 401 is configured to:

perform cell selection and/or cell reselection by decreasing a value of a judging parameter of a first cell in the predetermined cell; and/or perform cell selection and/or cell reselection by increasing a value of a judging parameter of a second cell in the predetermined cell, where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

Optionally, when executing the computer program, the processor 401 is configured to:

perform cell selection and/or cell reselection by increasing a priority of a first cell in the predetermined cell; and/or perform cell selection and/or cell reselection by decreasing a priority of a second cell in the predetermined cell;

where the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

The terminal 400 can implement various processes implemented by the terminal in the foregoing embodiments. To avoid repetition, details are not described herein again.

In the terminal according to the embodiments of the present disclosure, the processor 401 detects a state parameter of a terminal and obtains measurement configuration information configured based on the state parameter. In such a manner, power consumption of the terminal is saved in a communication system.

Figure 5:
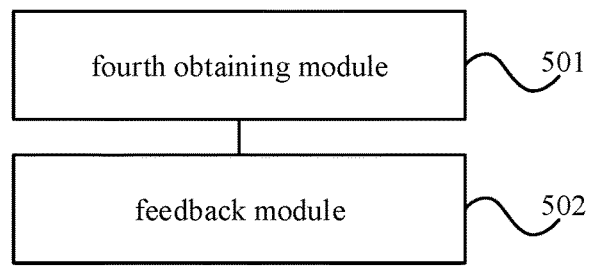
FIG. 5 is a schematic block diagram of a base station according to some embodiments of the present disclosure.

As shown in FIG. 5, some embodiments of the present disclosure provide a base station, which includes: a fourth obtaining module 501 configured to obtain a state parameter of a terminal; and a feedback module 502 configured to feed back measurement configuration information to the terminal based on the state parameter.

Specifically, the state parameter includes at least one of: a type of the terminal, an environment where the terminal is located, mobile state information of the terminal, service state information of the terminal, information about a signal coverage at a location where the terminal is located, or mode information of the terminal, where the mode information includes a measurement mode of the terminal or a power saving mode of the terminal.

Optionally the fourth obtaining module 501 includes:

a second receipt submodule, configured to receive a predetermined message transmitted by the terminal; and an obtaining submodule, configured to obtain the state parameter of the terminal from the predetermined message, where the predetermined message is a radio resource control RRC message or a user assistance message.

Optionally, the base station further includes: a second transmission module, configured to transmit parameter reporting configuration information to the terminal, where the parameter reporting configuration information is used to indicate whether reporting of the state parameter is allowed.

Specifically, the fourth obtaining module 501 is configured to: obtain the state parameter of the terminal based on stored predetermined information of the terminal, where the predetermined information includes information related to determining the state parameter.

Optionally, the feedback module 502 includes:

a first obtaining submodule, configured to obtain mode information of the terminal based on the state parameter;

a second obtaining submodule, configured to obtain the measurement configuration information corresponding to the mode information; and a feedback submodule, configured to feed the measurement configuration information back to the terminal.

Optionally, the base station further includes a second receipt module, configured to receive configuration assistance information transmitted by the terminal, where the configuration assistance information includes at least one of: a measurement period expected by the terminal, identification information of the measurement configuration information corresponding to the state parameter, or mode information of the terminal.

Optionally, the base station further includes a third transmission module, configured to transmit a measurement configuration parameter to the terminal; where the measurement configuration parameter includes at least one of: measurement requirement information, periodicity information of a measurement, event configuration information of the measurement, or mode information of the terminal.

Optionally, the base station further includes: a fourth transmission module, configured to transmit, through a target cell, configuration indication information of a predetermined cell to the terminal, where the configuration indication information is configured for the terminal to perform cell selection and/or cell reselection according to the configuration indication information, where the configuration indication information is used to indicate whether the predetermined cell supports a manner of determining configuration information based on the state parameter of the terminal, or supports mode information of the terminal, the predetermined cell includes the target cell and/or a neighbor cell of the target cell, and the target cell is a cell where the terminal camps or accesses.

It should be noted that these base station embodiments involve a base station corresponding to the method for terminal measurement and configuration applied to the base station side, all implementation manners of the above embodiments are applicable to these base station embodiments, and the same technical effects can be achieved.

Embodiments of the present disclosure further provide a base station, including: a memory, a processor, and a computer program that is stored on the memory and executable on the processor. When executing the computer program, the processor is configured to implement various processes of the method for terminal measurement and configuration applied to the base station side in the above embodiments, and the same technical effects can be achieved, which are not repeated again to avoid repetition.

Embodiments of the present disclosure further provide a computer readable storage medium, which stores a computer program. The computer program is executed by a processor to implement various processes of the method for terminal measurement and configuration applied to the base station side in the above embodiments, and the same technical effects can be achieved, which are not repeated again to avoid repetition. The computer readable storage medium includes, for example, a read-only memory (ROM), a random access memory (RAM), a magnetic disk, or an optical disk.

Figure 6:
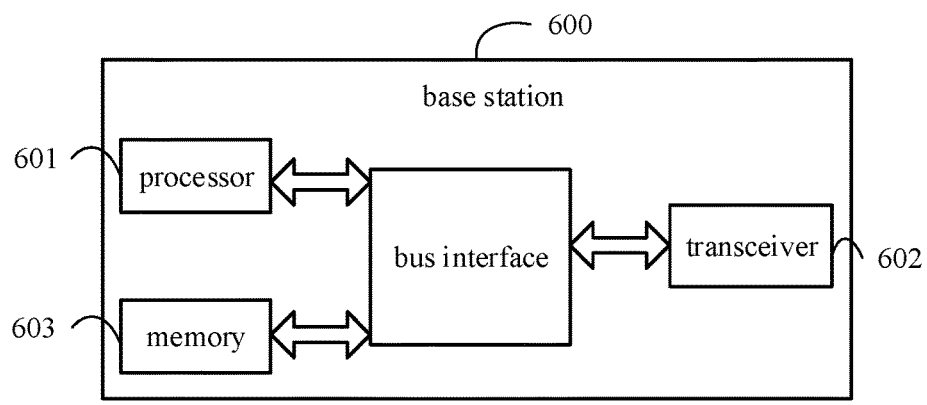
FIG. 6 is a structural block diagram of a base station according to some embodiments of the present disclosure.

FIG. 6 is a structural diagram of a base station according to some embodiments of the present disclosure, which can implement the above-described details of the method for terminal measurement and configuration applied to the base station side, and achieve the same effects. As shown in FIG. 6, the base station 600 includes a processor 601, a transceiver 602, a memory 603, and a bus interface.

The processor 601 is configured to read a program from the memory 603 and perform the following processes:

obtaining a state parameter of a terminal; and feeding back measurement configuration information to the terminal based on the state parameter by the transceiver 602.

The state parameter includes at least one of: a type of the terminal, an environment where the terminal is located, mobile state information of the terminal, service state information of the terminal, information about a signal coverage at a location where the terminal is located, or mode information of the terminal, where the mode information includes a measurement mode of the terminal or a power saving mode of the terminal.

In FIG. 6, the bus architecture may include any number of interconnected buses and bridges, specifically linked by one or more processors represented by the processor 601 and various circuits of memory represented by the memory 603. The bus architecture may also connect various other circuits such as peripherals, voltage regulators and power management circuits, which is well known in the art. Therefore, a detailed description thereof is omitted herein. The bus interface provides an interface. The transceiver 602 may be multiple components, such as multiple receivers and transmitters, providing means for communicating with various other devices on a transmission medium.

The processor 601 is responsible for the management of the bus architecture and general processing, and the memory 603 can store data used by the processor 601 in performing operations.

Optionally, when reading a program in the memory 603, the processor 601 is further configured to: receive, by the transceiver 602, a predetermined message transmitted by the terminal; and obtain the state parameter of the terminal from the predetermined message, where the predetermined message is a radio resource control RRC message or a user assistance message.

Optionally, when reading a program in the memory 603, the processor 601 is further configured to: transmit parameter reporting configuration information to the terminal by the transceiver 602, where the parameter reporting configuration information is used to indicate whether reporting of the state parameter is allowed.

Optionally, when reading a program in the memory 603, the processor 601 is further configured to: obtain the state parameter of the terminal based on stored predetermined information of the terminal, where the predetermined information includes information related to determining the state parameter.

Optionally, when reading a program in the memory 603, the processor 601 is further configured to:

obtain mode information of the terminal based on the state parameter;

obtain the measurement configuration information corresponding to the mode information; and feed the measurement configuration information back to the terminal.

Optionally, when reading a program in the memory 603, the processor 601 is further configured to: receive, by the transceiver 602, configuration assistance information transmitted by the terminal, where the configuration assistance information includes at least one of: a measurement period expected by the terminal, identification information of the measurement configuration information corresponding to the state parameter, or mode information of the terminal.

Optionally, when reading a program in the memory 603, the processor 601 is further configured to: transmit, by the transceiver 602, a measurement configuration parameter to the terminal; where the measurement configuration parameter includes at least one of: measurement requirement information, periodicity information of a measurement, event configuration information of the measurement, or mode information of the terminal.

Optionally, when reading a program in the memory 603, the processor 601 is further configured to: transmit, through a target cell, configuration indication information of a predetermined cell to the terminal, where the configuration indication information is configured for the terminal to perform cell selection and/or cell reselection according to the configuration indication information, where the configuration indication information is used to indicate whether the predetermined cell supports a manner of determining configuration information based on the state parameter of the terminal, or supports mode information of the terminal, the predetermined cell includes the target cell and/or a neighbor cell of the target cell, and the target cell is a cell where the terminal camps or accesses.

The base station according to the embodiments of the present disclosure transmits the measurement configuration information obtained based on the state parameter of the terminal to the terminal, which solve a problem that an existing system does not have a scheme of performing measurement and configuration for a terminal state, thereby achieving communication integrity, and saving power consumption of a terminal in a communication system.

It should be noted that every embodiments in the specification are described in a progressive manner, each embodiment emphasizes differences from other embodiments and reference can be made to each other for similar parts among the embodiments.

A person of ordinary skill in the art may appreciate that embodiments in the present disclosure can be provided as a method, apparatus, or computer program product. Thus, the embodiments of the present disclosure may be implemented in an entirely hardware embodiment, in an entirely software embodiment, or in a combination of software and hardware. Moreover, the embodiments of the present disclosure may take the form of a computer program product embodied on one or more computer usable storage media (including but not limited to disk storage, CD-ROM, optical storage) including computer usable program codes.

Embodiments of the present disclosure are described with reference to flow charts and/or block diagrams of methods, terminal devices (systems), and computer program products according to the embodiments of the present disclosure. It may be understood that each flow and/or each block of the flow charts and/or block diagrams and a combination of each flow and/or each block of the flow charts and/or block diagrams may be implemented by computer program instructions. These computer program instructions can be provided to a processor of a general-purpose computer, a special-purpose computer, an embedded processor or other programmable data processing terminal devices to produce a machine, such that instructions are executed by a processor of a computer or other programmable data processing terminal device to implement a device with functions specified in one or more flows in the flow charts and/or one or more blocks in the block diagrams.

These computer program instructions can also be stored in a computer readable memory that can direct a computer or other programmable data processing terminal devices to operate in a specific manner, such that the instructions stored in the computer readable memory produce an article including an instruction device, and the instruction device implements the functions specified in one or more flows in the flow charts and/or one or more blocks in the block diagrams.

These computer program instructions can also be loaded onto a computer or other programmable data processing terminal devices such that a series of operational steps are performed on the computer or other programmable terminal devices to produce computer-implemented processing, such that the instructions are executed on the computer or other programmable data processing terminal devices to provide steps of the functions specified in one or more flows in the flow charts and/or one or more blocks in the block diagrams.

Although optional embodiments in the embodiments of the present disclosure have been described, a person of ordinary skill in the art can make additional changes and modifications to the embodiments once they are aware of the basic inventive concept. Therefore, the appended claims are intended to be interpreted as including all the optional embodiments and all the changes and modifications that fall within the scope of the embodiments of the present disclosure.

It should also be noted that, in this specification, relational terms such as first and second are used merely to distinguish one entity or operation from another entity or operation, without necessarily requiring or implying any such actual relationship or order between such entities or operations. Furthermore, the terms "include" or "comprise" or any other variations are intended to encompass a non-exclusive inclusion, such that a process, method, article, or terminal device that includes multiple elements includes not only those elements but also elements that are not listed, or includes elements inherent to such process, method, article, or terminal device. Without further limitations, an element preceded by the phrase "including a . . . " does not exclude the presence of additional identical elements in the process, method, article, or terminal device that includes the element.

The above descriptions are merely optional implementations of the present disclosure. It should be noted that, numerous modifications and improvements can be made by a person of ordinary skill in the art without departing from the principle of the present disclosure, and these modifications and improvements shall fall within the scope of the present disclosure.

What is claimed is:

1. A method for terminal measurement and configuration, applied to a terminal, comprising:
    detecting a state parameter of the terminal; and
    obtaining measurement configuration information configured based on the state parameter,
    wherein the state parameter comprises at least one of:
    a type of the terminal, an environment where the terminal is located, mobile state information of the terminal, information about a signal coverage at a location where the terminal is located, or mode information of the terminal, and
    wherein the mode information comprises a measurement mode of the terminal or a power saving mode of the terminal,
    wherein the obtaining the measurement configuration information configured based on the state parameter comprises:
        obtaining a measurement configuration parameter; and
        obtaining the measurement configuration information based on the measurement configuration parameter and the state parameter,
    or,
    the obtaining the measurement configuration information configured based on the state parameter comprises:
        transmitting the state parameter to a base station, and
        receiving the measurement configuration information fed back by the base station based on the state parameter,
    wherein the method further comprises: starting a state parameter reporting timer; and stopping transmitting the state parameter to the base station within a timing time of the state parameter reporting timer, or
    wherein when transmitting the state parameter to the base station, the method further comprises: transmitting configuration assistance information to the base station, wherein the configuration assistance information comprises at least one of: a measurement period expected by the terminal, identification information of the measurement configuration information corresponding to the state parameter, or mode information of the terminal.

2. The method for terminal measurement and configuration according to claim 1, wherein the state parameter further comprises service state information of the terminal.

3. The method for terminal measurement and configuration according to claim 1, wherein the measurement configuration parameter comprises at least one of: measurement requirement information, periodicity information of a measurement, event configuration information of the measurement, or mode information of the terminal; and
    wherein the measurement requirement information and the event configuration information of the measurement are determined in accordance with a predetermined rule, or are configured by a base station and transmitted to the terminal.

4. The method for terminal measurement and configuration according to claim 3, wherein when the measurement configuration parameter comprises the mode information of the terminal, the method for terminal measurement and configuration further comprises:
    obtaining a correspondence between the mode information and at least one of the measurement configuration information, the measurement requirement information, the periodicity information of the measurement, and the event configuration information of the measurement; and wherein the correspondence is determined in accordance with a preset rule; or the correspondence is configured by the base station for the terminal, and is transmitted to the terminal through one of: a dedicated radio resource control RRC message, an RRC configuration message, an RRC reconfiguration message, a system broadcast message, or a system message;
    or,
    wherein when the measurement configuration parameter comprises the mode information of the terminal, a manner of obtaining the mode information comprises:
    obtaining the mode information configured by the base station; or
    determining the mode information of the terminal according to a mode switching command transmitted by the base station; or
    determining the mode information of the terminal based on the state parameter.

5. The method for terminal measurement and configuration according to claim 1, wherein after obtaining the measurement configuration information configured based on the state parameter, the method further comprises:
   performing a measurement on a target parameter based on the measurement configuration information, and
   wherein the measurement comprises at least one of: a radio resource management RRM measurement, a radio link monitoring RLM measurement, or an idle mode measurement.

6. The method for terminal measurement and configuration according to claim 5, wherein when the measurement configuration parameter comprises periodicity information of the measurement, the performing the measurement on the target parameter comprises: performing a periodic measurement according to the periodicity information, and wherein a period of the periodic measurement is determined by at least one manner of:
   determining the period by a base station based on the state parameter of the terminal, and configuring the period for the terminal by the base station; or
   determining the period by the terminal based on the state parameter of the terminal; or
   determining the period in accordance with a predetermined rule, or
   wherein when the measurement configuration parameter comprises event configuration information of the measurement, the performing the measurement on the target parameter comprises: performing an event trigger measurement on the target parameter based on the event configuration information, and
   wherein event information in the event configuration information comprises at least one of: an access event of the terminal, a state parameter change event of the terminal, or an event triggered by the terminal based on a state parameter change, and
   wherein the event information is configured by a base station and transmitted to the terminal, or is determined by the terminal based on the state parameter.

7. The method for terminal measurement and configuration according to claim 5, wherein the performing the measurement on the target parameter comprises:
   determining, based on the state parameter of the terminal, whether the measurement is performed based on the measurement configuration information, or
   wherein after performing the measurement on the target parameter based on the measurement configuration information, the method further comprises:
   reporting a measurement result obtained by the performed measurement to a base station.

8. The method for terminal measurement and configuration according to claim 1, wherein the transmitting the state parameter to the base station comprises: either a first manner or a second manner,
   wherein the first manner comprises: transmitting the state parameter to the base station in a predetermined message, wherein the predetermined message comprises a radio resource control RRC message or a user assistance message,
   or,
   wherein the second manner comprises:
   receiving parameter reporting configuration information transmitted by the base station, wherein the parameter reporting configuration information is used to indicate whether reporting of the state parameter is allowed; and
   transmitting the state parameter of the terminal to the base station, in a case that the parameter reporting configuration information indicates that the reporting of the state parameter is allowed.

9. The method for terminal measurement and configuration according to claim 1, further comprising:
   receiving configuration indication information of a predetermined cell transmitted by a base station to which a target cell belongs, wherein the configuration indication information is used to indicate whether the predetermined cell supports a manner of determining configuration information based on the state parameter of the terminal, or supports mode information of the terminal; and
   performing cell selection and/or cell reselection according to the configuration indication information, wherein the predetermined cell comprises the target cell and/or a neighbor cell of the target cell, and the target cell is a cell where the terminal camps or accesses, and
   wherein the method further comprises: determining the predetermined cell to be an access barring cell, in a case that the configuration indication information indicates that the predetermined cell does not support the manner of determining the configuration information based on the state parameter of the terminal, or does not support the mode information of the terminal.

10. The method for terminal measurement and configuration according to claim 9, wherein the performing cell selection and/or cell reselection comprises:
   performing cell selection and/or cell reselection by increasing a value of a judging parameter of a first cell in the predetermined cell; and/or
   performing cell selection and/or cell reselection by decreasing a value of a judging parameter of a second cell in the predetermined cell, wherein the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal, or
   wherein the performing cell selection and/or cell reselection comprises:
   performing cell selection and/or cell reselection by increasing a priority of a first cell in the predetermined cell; and/or
   performing cell selection and/or cell reselection by decreasing a priority of a second cell in the predetermined cell, wherein the first cell is a cell that supports the manner of determining the configuration information based on the state parameter of the terminal, or supports the mode information of the terminal, and the second cell is a cell that does not support the manner of determining the configuration information based on the state parameter of the terminal, or does not support the mode information of the terminal.

11. A method for terminal measurement and configuration, applied to a base station, comprising:
   obtaining a state parameter of a terminal; and
   feeding back measurement configuration information to the terminal based on the state parameter,
   wherein the state parameter comprises at least one of:
   a type of the terminal, an environment where the terminal is located, mobile state information of the terminal, information about a signal coverage at a location where the terminal is located, or mode information of the terminal, and wherein the mode information comprises a measurement mode of the terminal or a power saving mode of the terminal, wherein the obtaining the state parameter of the terminal comprises:

receiving a predetermined message transmitting by the terminal; and obtaining the state parameter of the terminal from the predetermined message, wherein the predetermined message comprises a radio resource control RRC message or a user assistance message, or, wherein before receiving the state parameter of the terminal from the predetermined message transmitted by the terminal, the method further comprises:

transmitting parameter reporting configuration information to the terminal, wherein the parameter reporting configuration information is used to indicate whether reporting of the state parameter is allowed, or, wherein the obtaining the state parameter of the terminal comprises:

obtaining the state parameter of the terminal based on stored predetermined information of the terminal, wherein the predetermined information comprises information related to determining the state parameter.

12. The method for terminal measurement and configuration according to claim 11, wherein the state parameter comprises service state information of the terminal.

13. The method for terminal measurement and configuration according to claim 11, further comprising:

transmitting a measurement configuration parameter to the terminal; wherein the measurement configuration parameter comprises at least one of: measurement requirement information, periodicity information of a measurement, event configuration information of the measurement, or mode information of the terminal; or wherein the method further comprises transmitting, through a target cell, configuration indication information of a predetermined cell to the terminal, wherein the configuration indication information is configured for the terminal to perform cell selection and/or cell reselection according to the configuration indication information, the configuration indication information is used to indicate whether the predetermined cell supports a manner of determining configuration information based on the state parameter of the terminal, or supports mode information of the terminal, and the predetermined cell comprises the target cell and/or a neighbor cell of the target cell, and the target cell is a cell where the terminal camps or accesses.

14. A terminal, comprising: a memory, a processor, and a computer program that is stored on the memory and executable on the processor, wherein when executing the computer program, the processor is configured to:

detect a state parameter of the terminal; and obtain measurement configuration information configured bae on the state parameter, wherein the state parameter comprises at least one of:

a type of the terminal, an environment where the terminal is located, mobile state information of the terminal, information about a signal coverage at a location where the terminal is located, or mode information of the terminal, and wherein the mode information comprises a measurement mode of the terminal or a power saving mode of the terminal, wherein the obtaining the measurement configuration information configured based on the state parameter comprises:

obtaining a measurement configuration parameter; and obtaining the measurement configuration information based on the measurement configuration parameter and the state parameter, or, the obtaining the measurement configuration information configured based on the state parameter comprises:

transmitting the state parameter to a base station, and receiving the measurement configuration information fed back by the base station based on the state parameter, wherein the method further comprises: starting a state parameter reporting timer; and stopping transmitting the state parameter to the base station within a timing time of the state parameter reporting timer, or wherein when transmitting the state parameter to the base station, the method further comprises: transmitting configuration assistance information to the base station, wherein the configuration assistance information comprises at least one of: a measurement period expected by the terminal, identification information of the measurement configuration information corresponding to the state parameter, or mode information of the terminal.

15. The method for terminal measurement and configuration according to claim 11, wherein the feeding back the measurement configuration information to the terminal based on the state parameter comprises:

obtaining mode information of the terminal based on the state parameter;

obtaining the measurement configuration information corresponding to the mode information; and feeding the measurement configuration information back to the terminal.

* * * * *